(12) United States Patent
Hsu

(10) Patent No.: US 12,606,273 B2
(45) Date of Patent: Apr. 21, 2026

(54) ENERGY STORAGE BATTERY BASKET AND ELECTRIC BICYCLE WITH ENERGY STORAGE BATTERY BASKET

(71) Applicant: Haoting Technology Co., LTD., Taipei (TW)

(72) Inventor: Hao Ting Hsu, Taipei (TW)

(73) Assignee: Haoting Technology Co., LTD., Taipei (TW)

( * ) Notice: Subject to any disclaimer, the term of this patent is extended or adjusted under 35 U.S.C. 154(b) by 437 days.

(21) Appl. No.: 18/127,611

(22) Filed: Mar. 28, 2023

(65) Prior Publication Data

US 2024/0101221 A1 Mar. 28, 2024

(30) Foreign Application Priority Data

Sep. 22, 2022 (TW) ................................. 111210334
Dec. 30, 2022 (TW) ................................. 111150904

(51) Int. Cl.
| | |
|---|---|
| *B62M 6/90* | (2010.01) |
| *B62J 6/06* | (2006.01) |
| *B62J 9/21* | (2020.01) |
| *B62J 9/23* | (2020.01) |
| *H01M 50/249* | (2021.01) |

(52) U.S. Cl.
CPC .................. *B62M 6/90* (2013.01); *B62J 6/06* (2013.01); *B62J 9/21* (2020.02); *B62J 9/23* (2020.02); *H01M 50/249* (2021.01); *H01M 2220/20* (2013.01)

(58) Field of Classification Search
CPC ....... B62M 6/90; B62J 9/23; B62J 9/21; B62J 6/06; H01M 50/249; H01M 2220/20
See application file for complete search history.

(56) References Cited

U.S. PATENT DOCUMENTS

| | | | |
|---|---|---|---|
| 11,505,280 B2 * | 11/2022 | Ye | .............................. B62M 6/90 |
| 2011/0272203 A1 * | 11/2011 | Sugimoto | ................ B62M 6/90 |
| | | | 180/206.1 |

FOREIGN PATENT DOCUMENTS

| | | | | |
|---|---|---|---|---|
| CN | 107444561 A | * | 12/2017 | ............ H01M 50/20 |
| CN | 107482264 A | * | 12/2017 | .............. B62M 6/90 |

* cited by examiner

*Primary Examiner* — Faye M Fleming
(74) *Attorney, Agent, or Firm* — Che-Yang Chen

(57) ABSTRACT

An energy storage battery basket, adapted for equipping with an electric bicycle having a crossbar frame, includes a basket body and an energy storage base. The basket body has a storage space and includes at least a handle. The energy storage base, configured with a bottom of the basket body, includes at least one rechargeable battery provided therein, at least one electric terminal socket provided at a center of one side of the energy storage base, and at least one USB charging port, at least one Type C power supply port, at least one DC2.1 charging port, and at least a power switch provided at two sides of the electrical terminal socket respectively.

6 Claims, 4 Drawing Sheets

1

ENERGY STORAGE BATTERY BASKET AND ELECTRIC BICYCLE WITH ENERGY STORAGE BATTERY BASKET

BACKGROUND OF THE PRESENT INVENTION

Field of Invention

The present invention relates to a technical field of electric bicycle with energy storage battery basket, and more particularly to an energy storage battery basket configured to be arranged to both the front end portion and the rear end portion of a crossbar frame of various kinds of electric bicycle, and that the energy storage battery basket is detachable for use as a mobile power supply, so as to enhance the overall utility and convenience of the energy storage battery basket as well as the electric bicycle provided with the energy storage battery basket.

Description of Related Arts

Electric bicycle has advantages of compact in size and light that provides a source of power through its built-in battery pack to save the physical exertion of the riders and allow being ridden for a longer distance. Accordingly, the electric bicycle market is booming nowadays for the electric bicycle offering so much convenience.

However, the controller of the conventional electric bicycle is installed inside of its body which is not easy to maintain and repair. In addition, the battery packs of the conventional electric bicycle are custom made for each specific bicycle model. Therefore, the battery pack has to be redesigned correspondingly while the bicycle model is changed. Since the traditional battery pack fails to be universally used in various bicycle models, it not only increases the manufacturing cost but also causes inconvenience in use.

Therefore, there is a demand for developing an energy storage for electric bicycle which is different from the conventional electric bicycle battery pack configuration and able to be equipped with all electric bicycle models in market with shortened wiring, more concise overall appearance and enhanced overall utility and convenience.

SUMMARY OF THE PRESENT INVENTION

The invention is advantageous in that it provides an energy storage battery basket and electric bicycle with the energy storage battery basket, wherein the energy storage battery basket is adapted for all electric bicycle models and capable of being quickly installed to and detached from the electric bicycle model. In addition, the energy storage battery basket is a combined configuration of one or more battery packs with a basket of the electric bicycle that not only allows the energy storage battery basket to be detached for use as a mobile power source, but also provides electric power for the electric bicycle, so as to improve its overall utility and convenience and reduce its manufacturing cost.

Accordingly, the foregoing and other objects and advantages are attained by providing an energy storage battery basket, comprising:

a basket body having a storage space and provided with at least a handle, and an energy storage base, configured with a bottom of the basket body, comprising:

at least one rechargeable battery provided therein, at least one electric terminal socket provided at a center of one side of the energy storage base, and at least one USB charging port, at least one Type C power supply port, at least one DC2.1 charging port, and at least a power switch provided at two sides of the electrical terminal socket respectively.

In one preferred embodiment, an inverter is further connected with the electric terminal socket for adjusting output and input voltages.

According to the present invention, the foregoing and other objects and advantages are attained by providing an electric bicycle equipped with the energy storage battery basket. The electric bicycle comprises an electric bicycle body and the energy storage battery basket(s). The frame body comprises a body frame, a crossbar frame crossly transversely arranged on the body frame, and two electric terminal units provided at a front end portion and a rear end portion of the crossbar frame respectively. The energy storage battery basket is configured to be arranged at the front end portion or the rear end portion of the crossbar frame and the at least one electric terminal socket is electrically connected with the corresponding electric terminal unit provided at the front end portion or rear end portion of the crossbar frame.

In one preferred embodiment, the electric terminal of the energy storage battery basket and electric terminal unit provided at the front end portion or rear end portion of the crossbar frame have rectangular configurations adapted to be fittingly connected electrically. At least one combination lock is provided on the crossbar frame. Also, each of the electric terminal unit provided at the front end portion or the rear end portion of the crossbar fame is adapted to connect a bike lamp.

Still further objects and advantages will become apparent from a consideration of the ensuing description and drawings.

These and other objectives, features, and advantages of the present invention will become apparent from the following detailed description, the accompanying drawings, and the appended claims.

Figure 1:
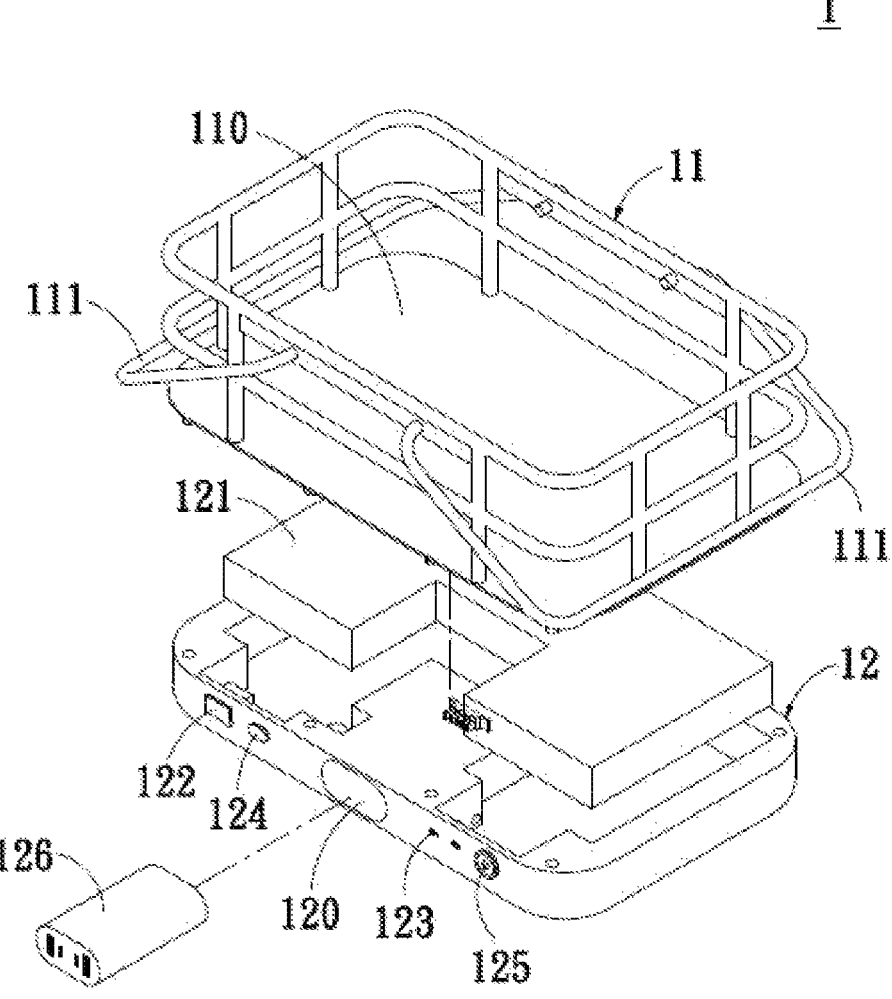
FIG. 1 is an exploded perspective view of a energy storage battery basket according to a preferred embodiment of the present invention.

The drawings, described above, are provided for purposes of illustration, and not of limitation, of the aspects and features of various examples of embodiments of the invention described herein. The drawings are not intended to limit the scope of the claimed invention in any aspect. For simplicity and clarity of illustration, elements illustrated in the drawings have not necessarily been drawn to scale and the dimensions of some of the elements may be exaggerated relative to other elements for clarity.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Further, this description is not to be considered as limiting the scope of the embodiments described herein in any way, but rather as merely describing implementation of the one or more embodiments described herein.

Figure 2:
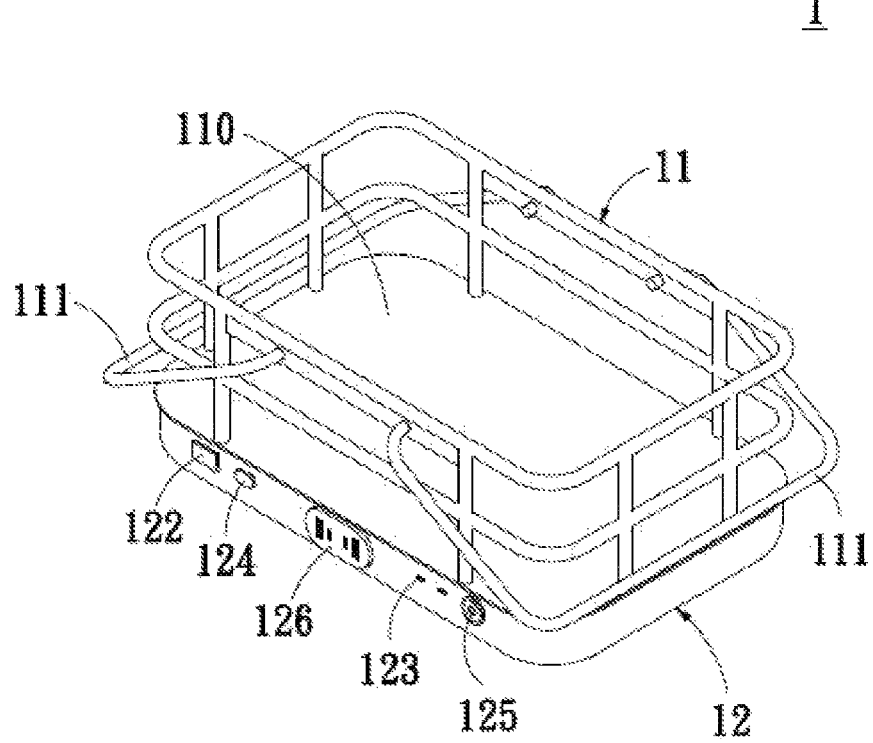
FIG. 2 is a perspective view of the energy storage battery basket according to the above preferred embodiment of the present invention.

Referring to FIG. 1 and FIG. 2, an exploded perspective view and a perspective view of an energy storage battery basket according to a preferred embodiment of the present invention are illustrated. As illustrated in the figures, the energy storage battery basket 1 of the present invention comprises a basket body 11 and an energy storage base 12. The basket body 11 has a storage space 110 defined therein and comprises at least one handle 111. The energy storage base 12 is combined with a bottom of the basket body 11 and comprises at least one flat rectangular rechargeable battery 121 therein, an electric terminal socket 120 provided at a center of one side of energy storage base 12, and at least one USB charging port 122, at least one Type C power supply hole 123, at least one DC2.1 charging port 124, and a power switch 125 being provided on both sides of the electric terminal socket 120.

In one preferred embodiment, an inverter 126 is further configured with the electric terminal socket 120 for adjusting output and input voltages.

Figure 3:
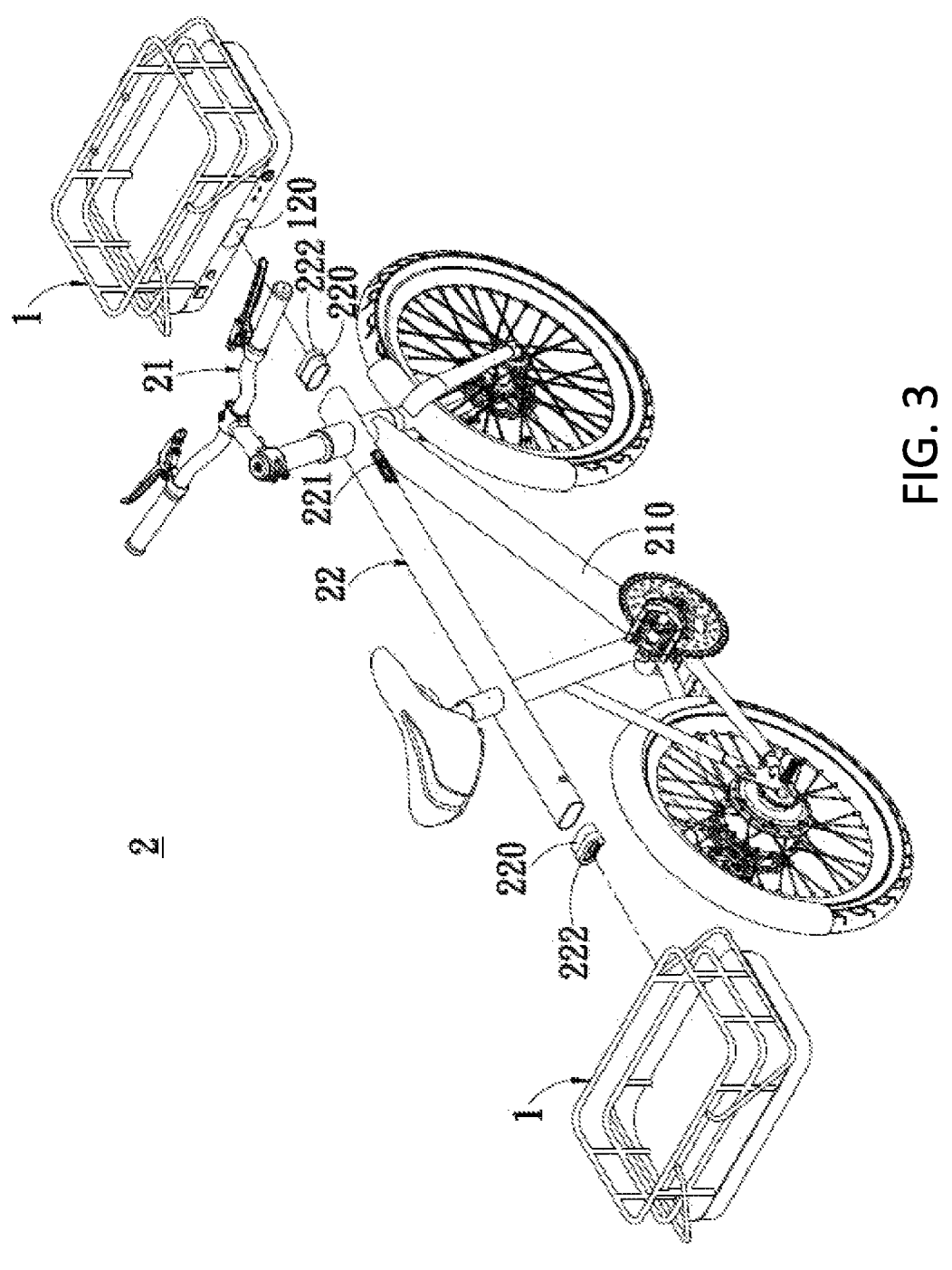
FIG. 3 is an exploded perspective view of an electric bicycle equipped with the energy storage battery baskets according to the above preferred embodiment of the present invention.
Figure 4:
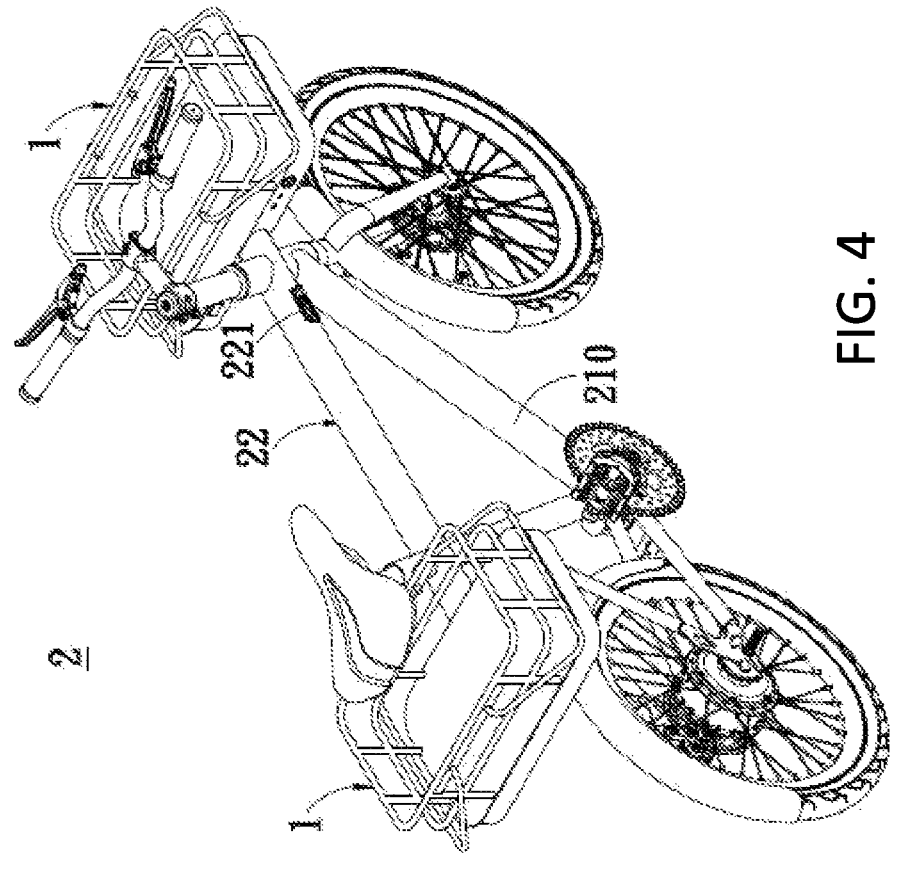
FIG. 4 is a perspective view of the electric bicycle equipped with the energy storage battery baskets according to the above preferred embodiment of the present invention.

Referring to FIG. 3 and FIG. 4, an exploded perspective view and a perspective view of an electric bicycle 2 equipped with two of the energy storage battery basket 1 according to the above preferred embodiment of present invention. As illustrated in the figures, the electric bicycle 2 with the energy storage battery basket of the present invention comprises an electric bicycle body 21 comprising a body frame 210 and a crossbar frame 22 mounted on the body frame 210, wherein two electric terminal units 220 are provided at a front end portion and a rear end portion of the crossbar frame 22 respectively. The two electric terminal units 220 are configured to electrically connect with the two electric terminal sockets 120 of two energy storage battery baskets 1 respectively while the two energy storage battery baskets 1 are mounted to the front end portion and the rear end portion of the crossbar fame 22 respectively.

In one preferred embodiment, both the electric terminal socket 120 of the energy storage battery basket 1 and the electric terminal unit 220 of the crossbar frame 22 have rectangular configuration and are adaptive with each other such that there is no relative rotation therebetween after the electric terminal socket 120 and the electric terminal unit 220 are electrical connected with each other so as to ensure a stable electrical connection. The crossbar frame 22 further comprises at least a combination lock 221 provided thereon so as for locking the electric bicycle body 21 at a predetermined location to prevent the electric bicycle 2 equipped with the energy storage battery baskets from being stolen. In addition, A bike lamp 222 is able to be electrically connected with each of electric terminal units 220 provided at the front end portion and the rear end portion of the crossbar frame 22 so as to provide a bike lighting effect while the corresponding electric terminal unit 220 is not connected with the energy storage battery basket 1. It is worth mentioning that the electric terminal unit 222 is capable of being configured to electrical connect with one or more electric terminal sockets 120 of one or more energy storage battery baskets 1.

In view of above, the energy storage battery basket 1 is configured for equipping with the electric bicycle through electrically connecting with the crossbar frame 22, In operation, the energy storage battery basket 1 provides electrical power supply to the electric bicycle. Furthermore, the energy storage battery basket 1 is also capable of rapidly detaching from the crossbar frame 22 to plug-in the inverter 126 (as shown in FIG. 1 and FIG. 2) to form an independent mobile power source.

In particular, when the user rides the electric bicycle 2 equipped with the energy storage battery basket 1 of the present invention to the outdoor or park for a picnic, the energy storage battery basket 1 not only can be used to carry food or items in the storge space 110, but also can be used as the mobile power source for charging mobile phones, or any electronic products, that significantly enhances the overall utility and convenience thereof.

Further, since the energy storage battery baskets 1 can be installed on the front end portion and the rear end portion of the crossbar 22 at same time respectively, such that the users may selectively install one or two energy storage battery baskets 1 for outdoor use according to their own needs, so that its flexibility in use is enhanced while having more storage electric power available.

In view of above, in addition to the storage effect of the energy storage battery basket 1, the energy storage battery basket 1 is designed to have a flat bottom to create a thin and compact visual effect and provides the at least one USB charging port 122, the at least one Type C power supply hole 123, the at least one DC2.1 charging port 124, and the power switch 125, that not only stores electric power but also provides electric power supply. Also, the energy storage base 12 is arranged under the basket body 11 that can shorten the wiring path while the wiring can be neat. Also, the inner space of the crossbar fame 22 can be used for wiring and installing controllers and the like therein, that provides a lighter wiring design while reducing the manufacturing cost and enhancing the overall utility and convenience.

In comparison to conventional art, the energy storage battery basket and the electric bicycle with the energy storage battery basket of the present invention mainly adopt the lean and lightweight structural design, wherein the energy storage battery basket is configured to be installed to the front end portion and/or the rear end portion of the crossbar frame 22 according to the requirement and needs. The energy storage battery basket 1 not only can supply electric power to the electric bicycle 2, but also can be used to store and carry items and function as mobile power source, so as to enhance its convenience and utility.

Although the foregoing description and drawings have revealed preferred embodiment of the present invention, it is necessary to understand that various additions, modifications and substitutions may be applied to the preferred embodiment of the present invention without departing from the spirit and scope of the inventive concepts and principles as defined by the claims appended. Those skilled in the art will be able to appreciate that the present invention may be used for modification of many forms, structures, arrangements, proportions, materials, elements, and components. Accordingly, the preferred embodiment disclosed above should be regarded as illustrative of the present invention, but not to limit the present invention. The scope of the present invention shall be defined by the claims appended and shall cover its equivalents without limitation to the previous description.

What is claimed is:

1. An energy storage battery basket for equipping with an electric bicycle comprising a crossbar frame, comprising:

a basket body having a storage space and comprise at least a handle; and an energy storage base, configured with a bottom of the basket body, comprising:

at least one rechargeable battery provided therein, at least one electric terminal socket provided at a center of one side of the energy storage base, at least one USB charging port, at least one Type C power supply port, at least one DC2.1 charging port, and at least a power switch provided at two sides of the electrical terminal socket respectively, and an inverter in the electric terminal socket for adjusting output and input voltages.

2. An electric bicycle, comprising:

an electric bicycle body which comprises:

a body frame, and a crossbar frame, transversely arranged on the body frame, and two electric terminal units provided at a front end portion and a rear end portion of the crossbar frame respectively; and at least one energy storage battery basket, which comprises:

a basket body having a storage space and comprise at least a handle; and an energy storage base, configured with a bottom of the basket body, comprising:

at least one rechargeable battery provided therein, at least one electric terminal socket provided at a center of one side of the energy storage base, and at least one USB charging port, at least one Type C power supply port, at least one DC2.1 charging port, and at least a power switch provided at two sides of the electrical terminal socket respectively;

wherein each of the electric terminal units of the crossbar frame is plugged in the electric terminal socket of the energy storage battery basket so as to electrically connect the at least one rechargeable battery with the electric bicycle to provide electric power supply, such that the energy storage battery basket is positioned at a front side or a rear side of the frame body of the electric bicycle.

3. The electric bicycle, as recited in claim 2, wherein the electric terminal socket of the energy storage battery basket and the electric terminal units of the crossbar frame have rectangular configurations and are adaptive with each other for electrical connection such that there is no relative rotation therebetween after the electric socket and the electric terminal unit are electrically connected with each other.

4. The electric bicycle, as recited in claim 2, further comprising at least one combination lock provided on the crossbar frame.

5. The electric bicycle, as recited in claim 2, further comprising one or more bike lamp configured to be electrically connected with the electric terminal units provided at the front end portion and the rear end portion of said crossbar frame.

6. The electric bicycle, as recited in claim 2, wherein the electric terminal units of the front and rear end of said crossbar frame are able to be electrically connected with the electric terminal socket of the energy storage battery basket.

* * * * *